US012673714B2

(12) United States Patent
Zehfuss

(10) Patent No.: US 12,673,714 B2
(45) Date of Patent: Jul. 7, 2026

(54) WAGON WITH RECLINING SEAT FOR CARRYING CHILDREN

(71) Applicant: Dynamic Motion, LLC, Richmond, VA (US)

(72) Inventor: Mark Zehfuss, Glen Allen, VA (US)

(73) Assignee: Dybamic Motion, LLC, Richmond, VA (US)

( * ) Notice: Subject to any disclaimer, the term of this patent is extended or adjusted under 35 U.S.C. 154(b) by 0 days.

(21) Appl. No.: 18/128,067

(22) Filed: Mar. 29, 2023

(65) Prior Publication Data

US 2024/0326892 A1 Oct. 3, 2024

(51) Int. Cl.
| | |
|---|---|
| *B62B 7/10* | (2006.01) |
| *B62B 3/00* | (2006.01) |
| *B62B 3/02* | (2006.01) |
| *B62B 7/00* | (2006.01) |

(52) U.S. Cl.
CPC .............. *B62B 7/105* (2013.01); *B62B 3/007* (2013.01); *B62B 3/02* (2013.01); *B62B 7/008* (2013.01); *B62B 3/022* (2013.01); *B62B 7/10* (2013.01)

(58) Field of Classification Search
CPC .......... B62B 7/008; B62B 7/105; B62B 3/007
See application file for complete search history.

(56) References Cited

U.S. PATENT DOCUMENTS

| | | | | | |
|---|---|---|---|---|---|
| 2,976,912 | A | * | 3/1961 | Dias .......................... | B62B 7/12 |
| | | | | | 280/30 |
| 3,162,460 | A | * | 12/1964 | Davidson ............. | A47D 13/063 |
| | | | | | 280/658 |

| | | | | | |
|---|---|---|---|---|---|
| 3,330,575 | A | * | 7/1967 | Boudreau ................. | B62B 9/26 |
| | | | | | 280/649 |
| 3,402,939 | A | * | 9/1968 | De Falco ................ | B62B 9/102 |
| | | | | | 280/47.38 |
| 3,860,254 | A | * | 1/1975 | Wegener ................. | B62B 1/208 |
| | | | | | 280/78 |
| 4,044,411 | A | * | 8/1977 | Peterson ................ | A47D 7/002 |
| | | | | | 5/99.1 |
| 4,362,308 | A | * | 12/1982 | Hicks ......................... | B62B 1/00 |
| | | | | | 280/30 |
| 4,514,009 | A | * | 4/1985 | Vanderminden ......... | A47C 1/14 |
| | | | | | 297/27 |
| 4,623,163 | A | * | 11/1986 | Potts ..................... | A61G 5/0858 |
| | | | | | 280/47.38 |
| 4,867,505 | A | * | 9/1989 | Parker .................... | A47C 1/143 |
| | | | | | 297/27 |
| 5,050,900 | A | * | 9/1991 | Lee ........................... | B62B 7/04 |
| | | | | | 280/658 |
| 5,123,665 | A | * | 6/1992 | Levy ....................... | B62B 3/022 |
| | | | | | 280/659 |

(Continued)

FOREIGN PATENT DOCUMENTS

| | | | | | |
|---|---|---|---|---|---|
| CN | 105460070 | A | * | 4/2016 | |
| CN | 108433443 | A | * | 8/2018 | ............. A47D 13/02 |

(Continued)

*Primary Examiner* — Emma K Frick
(74) *Attorney, Agent, or Firm* — Bernard G. Pike; Pike IP Law, PLLC

(57) ABSTRACT

A folding wagon with a reclining seat for carrying small children or other articles. The folding wagon has a solid frame with scissor connections, that allow it to be compacted for storage and expanded for use. The seats may be reclined by extending a telescoping assembly on the frame of the wagon.

8 Claims, 5 Drawing Sheets

(56)  References Cited

U.S. PATENT DOCUMENTS

| | | | | |
|---|---|---|---|---|
| 5,498,054 | A * | 3/1996 | Tomlinson | A47C 4/03 |
| | | | | 297/53 |
| 5,544,864 | A * | 8/1996 | Gabriel-Lacki | A47D 13/063 |
| | | | | 256/25 |
| D379,165 | S | 5/1997 | Marozza et al. | |
| 5,911,432 | A * | 6/1999 | Song | B62B 7/14 |
| | | | | 280/47.38 |
| 5,921,574 | A * | 7/1999 | Driessen | B62B 7/10 |
| | | | | 280/47.38 |
| 6,422,405 | B1 * | 7/2002 | Haenszel | B65D 85/68 |
| | | | | 211/208 |
| 6,536,796 | B1 * | 3/2003 | Solomon | B62B 3/02 |
| | | | | 280/655 |
| 6,755,435 | B2 * | 6/2004 | Hsia | B62B 7/083 |
| | | | | 280/47.38 |
| 6,845,991 | B1 | 1/2005 | Ritucci et al. | |
| 7,131,154 | B2 * | 11/2006 | Davis | A61G 5/006 |
| | | | | 5/618 |
| 7,503,085 | B2 * | 3/2009 | Harrison | A61G 5/0825 |
| | | | | 5/99.1 |
| 8,070,180 | B2 * | 12/2011 | Stiba | B62B 9/28 |
| | | | | 280/47.38 |
| 8,083,253 | B1 * | 12/2011 | Butler | B62B 3/027 |
| | | | | 141/345 |
| 8,388,015 | B2 | 3/2013 | Chen | |
| 8,657,326 | B2 * | 2/2014 | Shaanan | B62B 9/102 |
| | | | | 280/47.38 |
| 8,864,222 | B2 * | 10/2014 | Grace | A47C 1/0265 |
| | | | | 297/354.12 |
| 9,085,311 | B1 | 7/2015 | Chen | |
| 9,108,656 | B1 * | 8/2015 | Nolan | B62B 3/02 |
| 9,221,484 | B2 * | 12/2015 | Logvin | B62B 3/007 |
| 9,469,324 | B2 * | 10/2016 | Bowman | B62B 3/022 |
| 9,623,890 | B1 | 4/2017 | Horowitz | |
| 9,738,298 | B1 * | 8/2017 | Yang | B62B 3/025 |
| 10,077,062 | B2 * | 9/2018 | Bowman | B62B 5/082 |
| 10,300,934 | B2 * | 5/2019 | Ostergaard | B62B 5/082 |
| 10,501,104 | B2 * | 12/2019 | Simmons | B60B 35/025 |
| 10,517,265 | B2 * | 12/2019 | Lin | B62B 3/02 |
| 10,610,025 | B1 * | 4/2020 | Zhu | A47C 7/006 |
| 10,913,478 | B1 * | 2/2021 | Zhou | B62B 7/105 |
| 10,913,481 | B2 * | 2/2021 | Kim | B62B 7/06 |
| 10,946,885 | B2 * | 3/2021 | Xiang | B62B 9/14 |
| 10,988,153 | B1 * | 4/2021 | Horowitz | B62B 7/008 |
| 11,097,761 | B2 * | 8/2021 | Kim | B62B 5/0043 |
| 11,465,664 | B1 * | 10/2022 | Choi | B62B 3/025 |
| 11,465,665 | B2 * | 10/2022 | Sturgeon | B62B 7/062 |
| 11,472,462 | B1 * | 10/2022 | Choi | B62B 7/105 |
| 11,498,601 | B2 * | 11/2022 | Zehfuss | B62B 7/008 |
| 2007/0284900 | A1 | 12/2007 | Sze | |
| 2010/0090444 | A1 | 4/2010 | Chen et al. | |
| 2010/0156069 | A1 | 6/2010 | Chen | |
| 2013/0049418 | A1 * | 2/2013 | Horn | A45F 4/02 |
| | | | | 297/217.1 |
| 2016/0347339 | A1 * | 12/2016 | Horvath | B62B 5/082 |
| 2023/0322284 | A1 * | 10/2023 | Zhu | B62B 3/007 |
| | | | | 280/651 |
| 2024/0190492 | A1 * | 6/2024 | Frankel | B62B 3/007 |

FOREIGN PATENT DOCUMENTS

| | | | | | | |
|---|---|---|---|---|---|---|
| KR | | 200483642 | Y1 * | 6/2017 | | |
| KR | | 200495263 | Y1 * | 4/2022 | | |
| KR | | 20240000488 | U * | 3/2024 | | |
| WO | WO-2011099005 | A1 * | 8/2011 | | | B62B 7/008 |
| WO | WO-2023129428 | A1 * | 7/2023 | | | B62B 3/007 |
| WO | WO-2023250166 | A1 * | 12/2023 | | | B62B 7/06 |

* cited by examiner

WAGON WITH RECLINING SEAT FOR CARRYING CHILDREN

FIELD OF THE INVENTION

A wagon may be capable of being folded from an expanded in-use configuration for carrying small children and/or other articles to a compact storage configuration for the storage or transport of the wagon when it is not in-use and unfolded from the storage or transport configuration to the in-use configuration.

The wagon may further comprise at least one reclining seat back. The reclining seat backs may be located on at least one end of the wagon and allow a child sitting on the floor or seat area of the wagon to recline to ride more comfortably or sleep in the wagon. Embodiments of the foldable wagon may comprise either a footwell and at least one reclining seat or just one of these features. The reclining seatback may comprise a seatback frame wherein a bottom portion of the seat back frame is pivotally connected to a bottom frame, the floor of the wagon cargo portion, or other component of the wagon frame. The top portion of the seat back frame is connected or engaging an expandable section of the wagon frame. The seat back may comprise a seat back fabric cover over a seatback frame. The seat back fabric cover may be attached to the frame such that a child can support their back on the seatback fabric cover. The expandable section may be moved from a retracted position to an extended position or an intermediate position to adjust an angle of recline of the seat back.

Additionally, the foldable wagon may comprise a frame and a fabric cover supported over the frame to define the wagon features and structure. The fabric cover may comprise a footwell cover. In some embodiments, the footwell cover is also a footrest bottom that may be connected in place to form a portion of the wagon cargo floor. The wagon comprises a reclosable opening in the bottom floor of the wagon to provide a complete wagon floor by covering the footwell.

BACKGROUND

Wagons have a cargo space or bed that may be used to carry articles, groceries, children, and other supplies, for example. Typically, a wagon comprises a wagon bed defined by a fabric cover having a floor and side panels, at least one handle, and four wheels. Some conventional wagons may be folded from an open in-use configuration to collapsed storage configuration. Such folding wagons may have a fabric basket capable of carrying a variety of articles and/or children when the wagon is unfolded for use in its in-use configuration.

A folding wagon is described in U.S. Pat. No. 5,957,482 filed Aug. 30, 1996, for example. The wagon may be folded from a flat position for use to a position which the two bed halves are in face-to-face contact for storage. Furthermore, the removable rail modules may be removable for storage.

None of the folding wagons provide comfortable modifications of a cargo wagon for carrying at least one child. There is a need for a folding wagon comprising at least one reclining seat back to allow a child to be more comfortably carried. There is also a need for a folding wagon comprising a footwell to allow the child sit more naturally. There is a still further need for such a stroller to have two seats with reclining seat backs with two removable sunshades, one over each seat.

SUMMARY OF THE INVENTION

Figure 1:
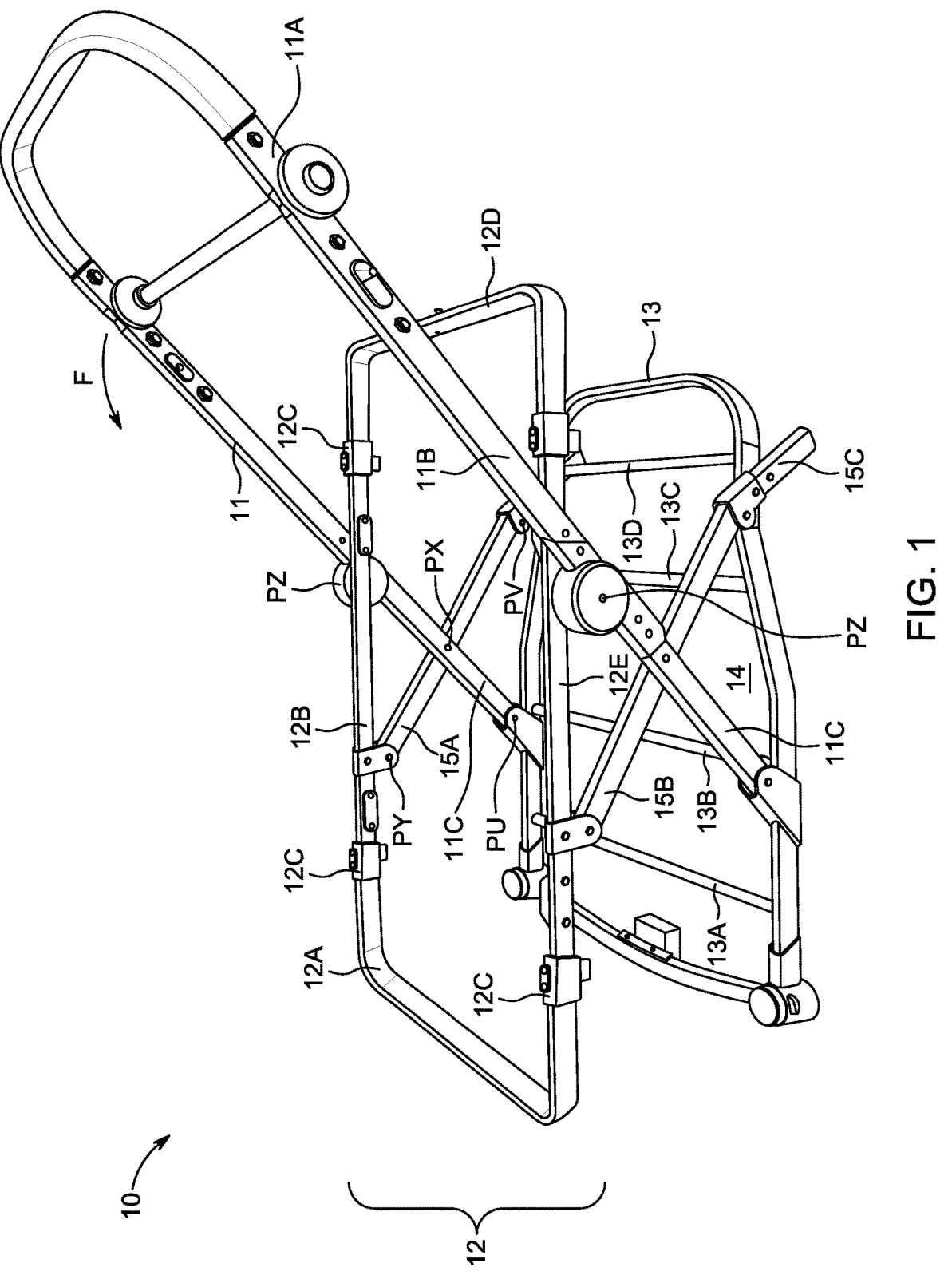
FIG. 1 depicts an embodiment of a frame for a wagon for carrying children with reclining seats, wherein the wagon frame is shown an in-use configuration.

Embodiments of a wagon or a foldable wagon may comprise comfort and convenience modifications for carrying children and/or other articles. The comfort modifications may include at least one reclining seat, a footwell, accessory connectors, and/or individual sunshades on each end of the wagon with two seats. Embodiments of wagon for carrying children may comprise a frame, wherein the frame may be a foldable frame. For example, the foldable wagon may comprise scissoring side frames that may be expanded to convert the wagon to an in-use configuration and be compressed to convert the wagon to a storage configuration. Other wagons incorporating these features may have a rigid, non-folding structure.

The frame may further comprise a bottom support frame, wherein the bottom support frame comprises a plurality of bottom frame members and the plurality of bottom frame members define a footwell aperture. The footwell aperture may be adjacent to seat support frame members so that a child may sit on the seat support frame and may lower their feet through the footwell aperture and rest them on the bottom surface or the fabric cover of the footwell.

The wagon frame may comprise left and right frames, front and rear frames, and the bottom frame. The left frame and the right frame may be foldable frames such as, but not limited to, scissoring folding frames. Scissoring folding frames allow the length or height of the side frame to be reduced as the individual frame member rotate relative to each other. The wagon may comprise a fabric cover supported over the frame to define the wagon features such as, but not limited to, the walls and floor and, optionally, a footwell and/or a reclining seatback of the wagon. The fabric cover may further comprise a footwell cover that extends over the footwell aperture and connects to the fabric cover defining the floor of the wagon. The fabric cover may comprise several panels that cover the frame and define a cargo volume in the wagon. The fabric cover may further comprise at least one individual panel that extends over the reclining seat frames to provide support for the child sitting or lying in the wagon's cargo volume.

An embodiment of the wagon for transporting children may comprising a frame or frame assembly comprising at least one seat support frame and at least one side frame. The seat support frame has a retracted position and an extended position relative to the side frame. wherein the extended position corresponds to a seat recline position and the retracted position corresponds to an upright seat back position. One of the seat support frame and the side frame may telescope within the other of the rear seat support frame and the side frame such that telescoping the frame members converts the seat support frame from the retracted position to the extended position and vice versa.

Additionally, the fabric cover may comprise the footwell side walls panels and footwell bottom panel defining the footwell inner volume. In some embodiments, the fabric cover may further comprise a footwell closing panel that extends over the footwell aperture and covers the footwell inner volume. The footwell closing panel may be a portion of the wagon cover, such as, but not limited to the footwell floor, or may be connected to the footwell bottom panel and, optionally, to the fabric cover side panels. The footwell may be opened or closed as desired for use of the wagon.

In order to support the footwell bottom panel, a footwell support member may be connected to the bottom frame member. The footwell support member may extend from the bottom support frame, below the footwell aperture in the frame with the wagon in an in-use configuration. The footwell support frame may be rotatably connected to the bottom frame. In embodiments wherein the bottom frame comprises two hingedly connected sections rotatable at a bottom frame pivot axis, the footwell support member may be U-shaped (or other appropriate shape) and also connected to the bottom frame pivot axis.

The wagon frame may further comprise upper accessory connectors. The upper accessory connectors may be on top of corner wagon support post, on the top of the scissor frame end frames, or other appropriate portions of the frame. The accessory connectors may be used to connect individual sunshades to one or both ends of the wagon to provide protection from sun, rain, and/or wind to a child in the reclining seats. In embodiments with four accessory connectors (one at each corner of the wagon frame, for example), one canopy may comprise four connectors capable of connecting to the accessory connectors to provide protection to the substantially the entire cargo inner volume. Other accessories may be attached. The accessories include, but are not limited to, a food/drink cooler, a table surface, drink holders, umbrella holder, adult seat, cell phone holder, combinations thereof, or other desired accessories.

Aspects of the stroller are presented in various embodiments, however one skilled in the art will understand various variation and interchangeability of the components of the various embodiments which are intended to be included in the scope of the invention.

DETAILED DESCRIPTION

Embodiments of a wagon for carrying children or other articles comprise a folding frame 1 and fabric covers components mounted on the folding frame using conventional techniques in the art such as making a sleeve to receive the frame components, use of grommets, hook and loop connectors, stitching, or other connectors.

Embodiments of a wagon or a foldable wagon may comprise comfort and convenience modifications for carrying children and/or other articles. The comfort modifications may include at least one reclining seat or reclining seat back that may be moved from an upright seat position to a reclined position and a footwell in the bottom surface or floor of the wagon adjacent to the seats. In some embodiments, the upright seat position may be a first reclined position and the seat recline position is a second reclined position, wherein the second reclined position has a larger recline angle than the first recline position.

Embodiments of wagon comprise a frame, wherein the frame may be a foldable frame or a rigid frame. For example, the foldable wagon with a foldable frame may comprise scissoring side frames that may be expanded to convert the wagon to an in-use configuration and be compressed to convert the wagon to a storage configuration. Other wagons incorporating these features may have a rigid, non-folding structure. In some embodiments the side frame may be a side wall, for example.

For an embodiment of the wagon comprising a rigid frame, the seat support frame may telescope or otherwise be retracted or extended into a side wall or side rail of the wagon, for example. Wagons comprising side walls that are not foldable to a storage configuration are known in the art.

The frame may comprise a bottom support frame, wherein the bottom support frame comprises a plurality of bottom frame members and, in some embodiments, the bottom frame members may comprise a plurality of bottom frame members that define a footwell aperture. A footwell having a footwell floor below the level of the wagon floor or seats may extend through the footwell aperture to provide a location for children in the wagon to place their feet. The footwell may be defined by the fabric cover or be rigidly formed in the wagon floor. For embodiments, wherein the footwell is part of the fabric cover, the footwell floor may also be connected to the wagon floor to eliminate the footwell and provide a complete wagon floor. The footwell floor may be reversibly connected to the wagon floor by snaps, at least one zipper, hook and loop connectors, buttons and button holes or loops, or other connectors.

The footwell aperture may be adjacent to a seat support frame comprising seat support frame members so that a child may sit on the seat support frame members and may lower or rest their feet through a footwell aperture and rest them on the footwell bottom surface or the fabric cover of the footwell.

The wagon frame may also comprise left and right frames, front and rear frames, and the bottom frame. The left frame and the right frame may be foldable frames such as, but not limited to, scissoring folding frames. Scissoring folding frames allow the side the length or height of the side frame to be reduced as the individual frame member rotate relative to each other.

The wagon may comprise a fabric cover supported over the frame to define the wagon features such as, but not limited to, front wall, rear wall, left wall, right wall, floor, and, optionally, a footwell and/or a reclining seatback or seatbacks of the wagon. The fabric cover may further comprise a footwell cover that extends over the footwell aperture and connects to the fabric cover defining the floor of the wagon. As previously stated, the footwell cover and the footwell bottom may be the same portion of the cover. The footwell cover when connected over the footwell aperture defines a portion of the wagon floor.

The fabric cover over the wagon may comprise several panels that cover the frame and define a cargo volume or bed in the wagon. The fabric cover may further comprise at least one individual panel that extends over the reclining seat frames to provide support for the child sitting or lying in the wagon's cargo volume.

Additionally, the fabric cover may comprise the footwell side walls panels and footwell bottom panel defining the footwell inner volume. In some embodiments, the fabric cover may further comprise a footwell closing panel that extends over the footwell aperture 14 and covers the footwell inner volume. The footwell closing panel may be part of a closeable opening to the footwell inner volume and may be connected to the footwell bottom panel and, optionally, to the fabric cover side panels. The footwell may be opened or closed as desired for use of the wagon. In some embodiments, the footwell closing panel is the same as the footwell bottom panel.

An embodiment of the wagon frame 10 for a wagon for transporting children is shown in FIG. 1. The wagon frame 10 comprises a top frame 12 and a bottom frame 13. The wagon for transporting children comprises a frame assembly comprising a first seat support frame and at least one side frame. In the embodiment of FIG. 1, the top frame 12 comprises a first seat support frame 12A, a second seat support frame 12D, a left side frame 12E, and a right side frame 12B.

Figure 2:
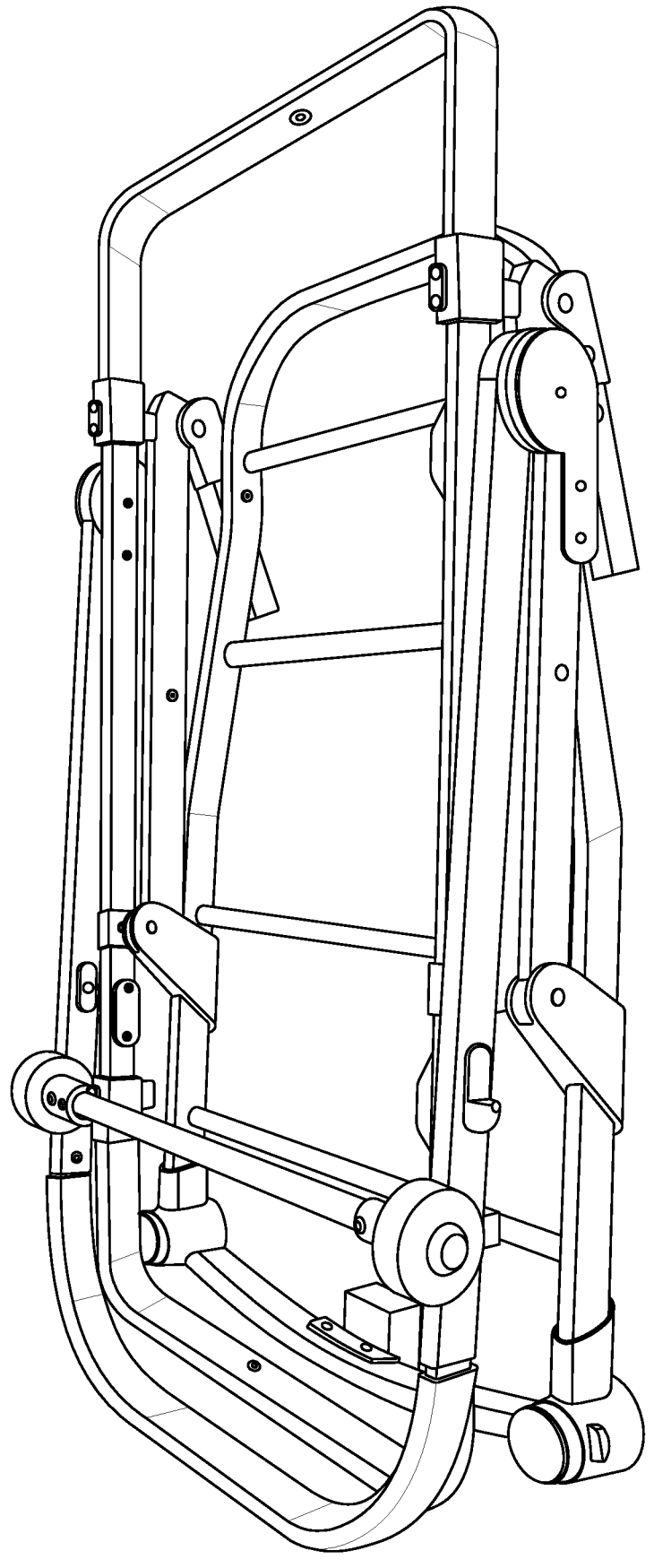
FIG. 2 depicts an embodiment of a frame for a wagon for carrying children with reclining seats, wherein wagon frame is shown in a storage configuration.

The top frame 12 and the bottom frame 13 are connected by a folding assembly. The folding assembly reduces the distance between the top frame 12 and the bottom frame 13 to convert the wagon frame from an in-use configuration (FIG. 1) to a storage configuration (FIG. 2). The wagon frame is shown in configuration between the in-us configuration (FIG. 1) and the storage configuration (FIG. 2). The wagon comprises a handle frame 11 comprising a handle 11A, a left upper handle frame 11B, a right upper handle frame 11B, a left lower handle frame 11C, and a right lower handle frame 11C. The folding assembly also comprises left cross bracing 15B, right cross bracing 15B, left cantilever frame 15C, and right cantilever frame 15C. The wagon may be folded from the in-use configuration (FIG. 1) to the folded configuration (FIG. 2) by unlocking the handle frame and rotating the left and right upper handle frames forward in the direction indicated by arrow F.

A length of the top frame 12 may be extended or retracted relative to the bottom frame 13 to allow reclining of a seat back. Thus, the first seat support frame 12A has a retracted position and an extended position relative to the side frames 12B and 12E. In the retracted position, the first seat support frame 12A will support a first seat back 20A (see FIG. 4) in an upright position. In the extended position, the first seat support frame 12A will support the first seat back 20A (see FIG. 4) in a reclining position. The first seat back 20A may be connected to the first seat support frame 12A or merely leaning, directly or indirectly, against the first seat support frame 12A. The embodiment shown in FIG. 1 has the first seat support frame 12A in the extended position. In this embodiment, the first seat support frame 12A has a telescoping configuration with the left side frame 12E and the right side frame 12B.

The telescoping frame is only one means or assembly for extending the frame to cause the seat back to recline. Means for extending the wagon frame include, but are not limited to, telescoping, sliding frame components (drawer sliders), folding extender that folds relative to the side frame, top reversibly connectable frame members, for example, seat support frame 12A may be disconnected from the side frames (or wall, or rails) and reattached in an extended position or a retracted position, threaded extender, spring biased extender, lever activated extender, attachable extenders, or a combination thereof, for example.

In another embodiment, these mechanisms may also be incorporated into the bottom frame to extend or retract the bottom frame relative to the top frame resulting in an alternative way of implementing the invention and reclining of the seat back or returning the seat back to an upright position.

Figure 4:
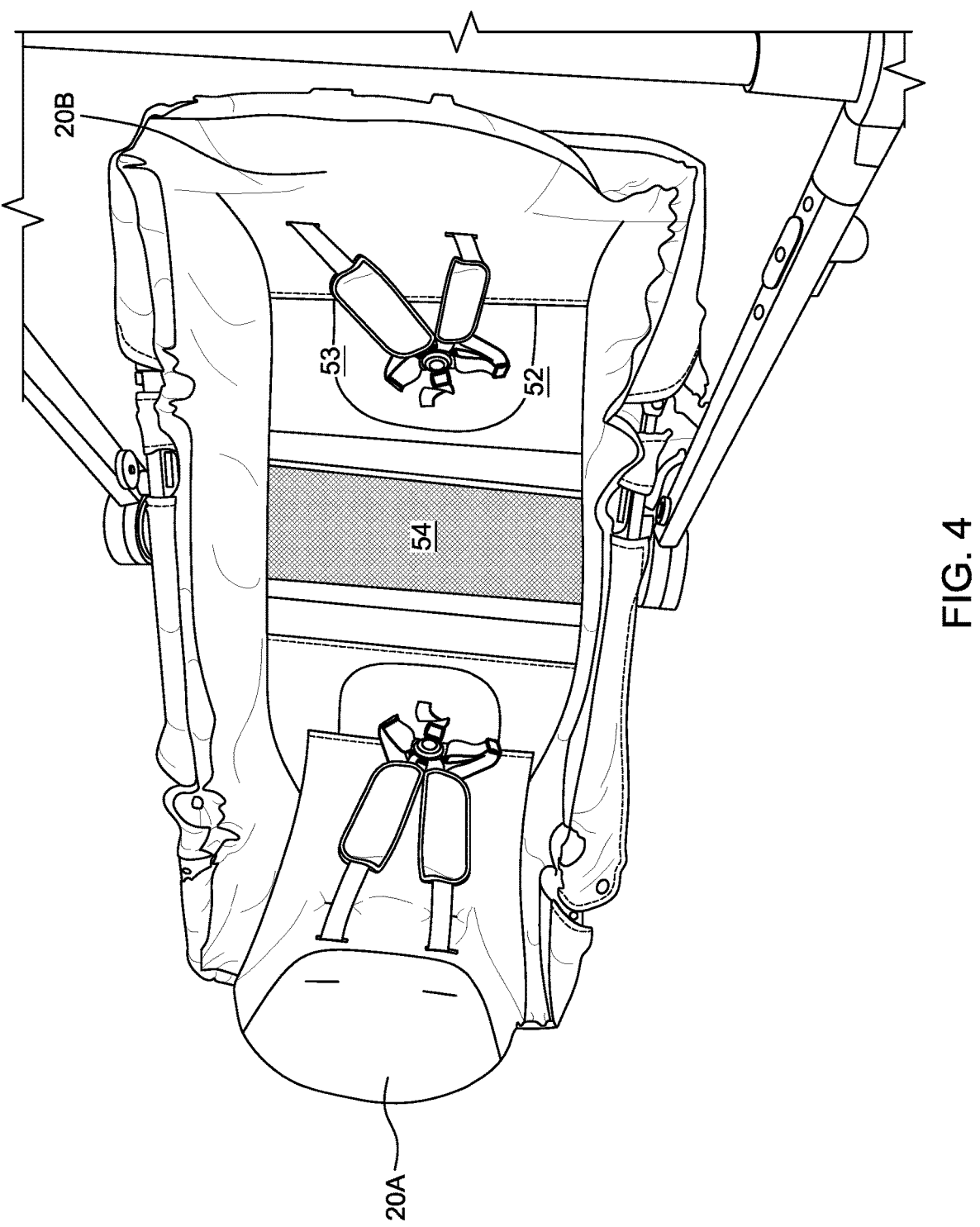
FIG. 4 depicts a first seat support frame supporting a first seat back in an upright position.
Figure 5:
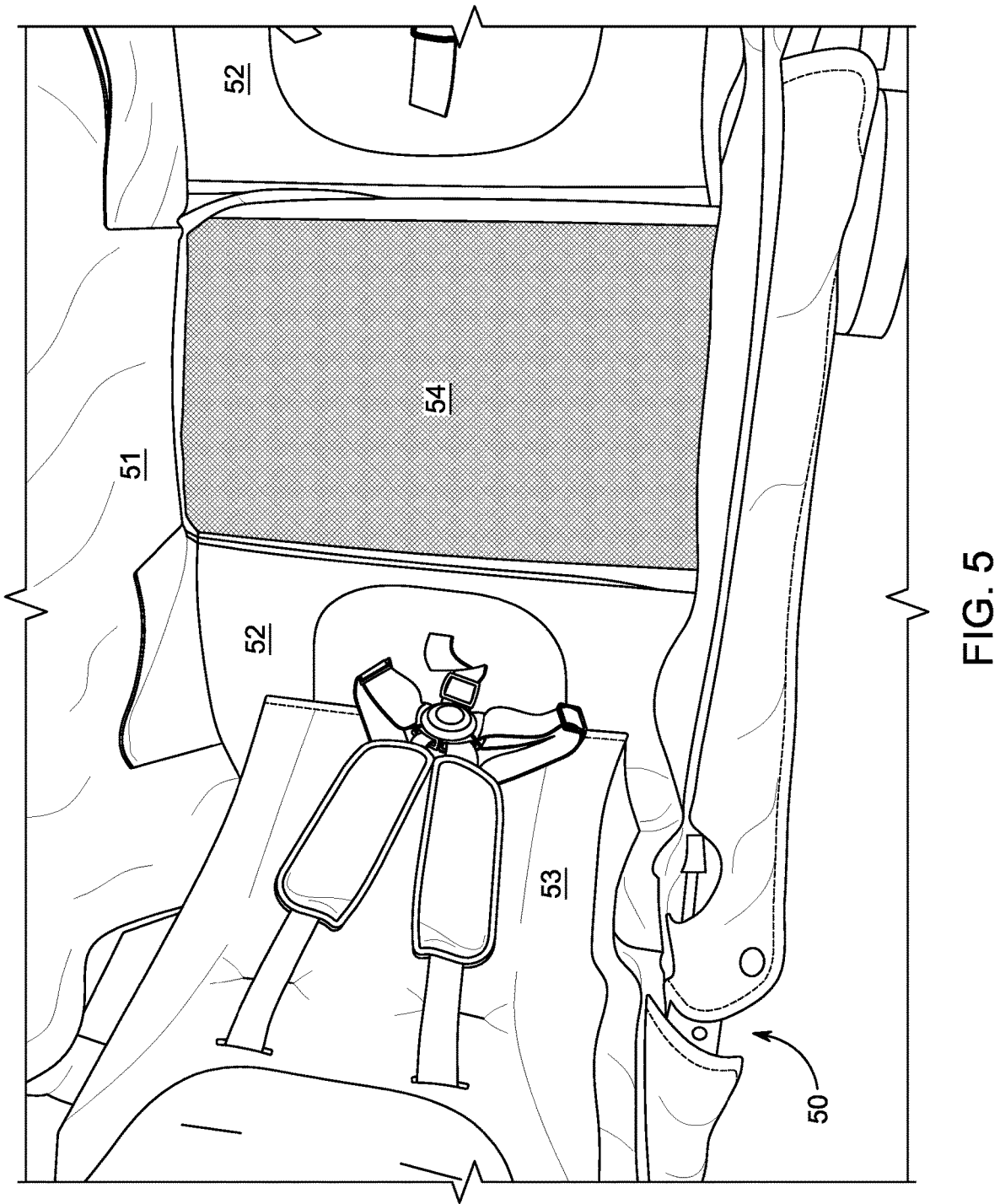
FIG. 5 depicts a top view of the wagon for carrying children with a cover.

This embodiment comprises a second reclining seat back 20B (see FIG. 4). The second seat support frame 12D also has a retracted position and an extended position relative to the side frames. In the retracted position, the second seat support frame 12A will support a second seat back 20B in an upright position. In the extended position, the second seat support frame 12B will support the second seat back 20B in a reclining position. The second seat back 20B may be connected to the first seat support frame 12B or merely leaning, directly or indirectly, against the second seat support frame 12B.

Figure 3:
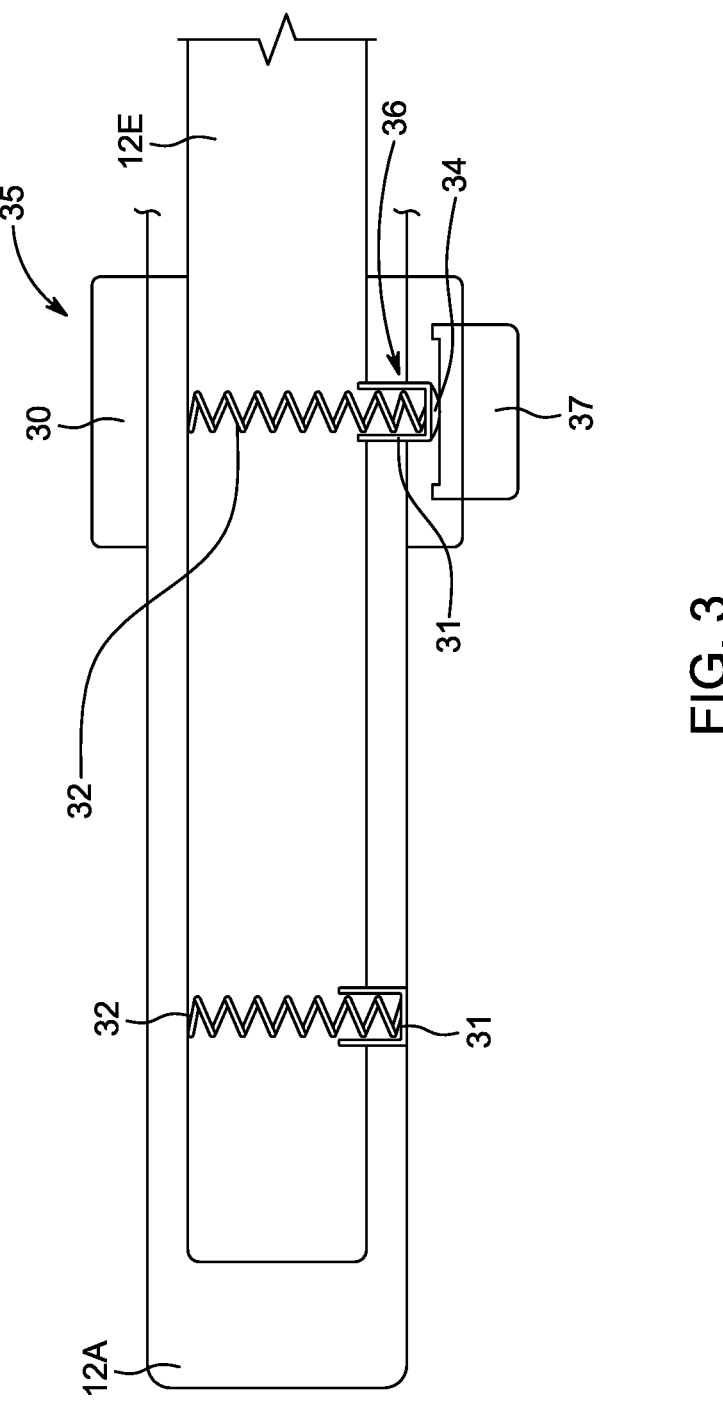
FIG. 3 shows a detail of an example of a telescoping assembly.

The embodiment shown in FIG. 1 has the first seat support frame 12A in the extended position. In this embodiment, the first seat support frame 12A has a telescoping configuration with the left side frame 12E and the right side frame 12B. FIG. 3 shows a detail of an example of a telescoping assembly. In this embodiment, the side frame 12E telescopes within the first seat support frame 12A. This telescoping assembly comprises a locking assembly 35 with a mechanism to lock the first seat support frame 12A in the extended position or the retracted position. The locking assembly 35 comprises a button frame 30, a locking member 31 within the side frame 12E, a biasing member 32 configured to bias the locking member 31 into the locked position in an aperture 36, a button 37, and a button biasing member 34.

Depressing button 37 biases locking member 31 out of the aperture 36 to allow the first seat support frame 12A to telescope over the side frame 12E to adjust the first seat back support frame 12A from the retracted position (shown) to the extended position.

The wagon comprises a cover or other panels 50 that define the wagon structure. The cover may be a fabric cover, for example. The fabric cover may comprise several panels that cover the frame and define a cargo volume in the wagon. The fabric cover may comprise side walls and a wagon cargo floor. The first seat back and, optionally, the second seat back may be rotatably connected to the wagon cargo floor to allow the first seat back to recline with movement of the seat back support to the extended position. At least one individual panel that extends over the reclining seat frames to provide support for the child sitting or lying in the wagon's cargo volume. The seat back may alternatively made of rigid material and not need a fabric cover to form the seat back.

Additionally, the fabric cover may comprise the footwell side walls panels and footwell bottom panel defining the footwell inner volume. In some embodiments, the fabric cover may further comprise a footwell closing panel that extends over the footwell aperture 14 and covers the footwell inner volume. The footwell closing panel may be part of a reclosable opening to the footwell inner volume and may be connected to the footwell bottom panel and, optionally, to the fabric cover side panels. The footwell may be opened or closed as desired for use of the wagon.

The wagon frame comprises a base frame 13. The base frame comprises seat support frames 13A 13B 13C and 13D. The seat support frames provide support for the cover. A portion of the wagon cargo floor is a seat 52. The seat back 53 may be rotatably connected to the seat 52 or the base frame. For example, the seat back 53 may be rotatably connected to the seat support frame 13A or 13B, for example. Further, the seat back is connected to the wagon base 54 or seat by a releasable connector or permanently attached. The releasable connector is one of hook and loop connector, a zipper, buttons, or buckles.

The embodiments of the described methods and the wagon are not limited to the embodiments, components, method steps, and materials disclosed herein as such components, process steps, and materials may vary. Moreover, the terminology employed herein is used to describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be affected within the scope of the invention as defined in the appended claims. Accordingly, the scope of the various embodiments of the present invention should not be limited to the above discussed embodiments and should only be defined by the following claims and all equivalents.

The invention claimed is:

1. A wagon for transporting children, comprising:
a frame assembly comprising a top frame comprises a first seat support frame, a second seat support frame, a left side frame, and a right side frame, wherein the first seat support frame, the second seat support frame, the left side frame and the right side frame form a closed rectangular frame; wherein the first seat support frame has a retracted position and an extended position relative to the side frame and wherein the first seat support frame and the second support frame each have a telescoping configuration with the left side frame and the right side frame such that telescoping the first seat support frame converts the seat support frame from the retracted position to the extended position and vice versa;
telescoping the second seat support frame converts the second seat support frame from the retracted position to the extended position a vice versa and wherein the extended position corresponds to a seat recline position and the retracted position corresponds to an upright seat back position;
a wagon base;
a first seat back rotatably connected to the wagon base and supported by the first seat support frame; and
a second seat back rotatably connected to the wagon base and supported by the second seat support frame.

2. The wagon of claim 1, comprising a cover supported by the frame assembly, wherein the cover comprises a footwell cover.

3. The wagon of claim 1, wherein the frame assembly comprises a locking mechanism for locking the first seat support frame in at least one of the retracted position or the extended position.

4. The wagon of claim 1, wherein the right side frame telescopes within the first seat support frame.

5. The wagon of claim 1, wherein four wheels are connected to the wagon base.

6. The wagon of claim 1, comprising an in-use configuration and a storage configuration.

7. The wagon of claim 6, wherein in the storage configuration the upper frame assembly is adjacent to the wagon base.

8. A wagon for transporting children, comprising:
a frame assembly comprising a top frame, wherein the top frame comprises a first seat support frame, a second seat support frame, a left side frame, and a right side frame, wherein the first seat support frame, the second seat support frame, the left side frame and the right side frame form a rectangular shape; wherein the first seat support frame has a retracted position and an extended position relative to the right side frame; and wherein the first seat support frame and the second support frame each have a telescoping configuration with the left side frame and the right side frame such that telescoping the first seat support frame converts the seat support frame from the retracted position to the extended position and vice versa; telescoping the second seat support frame converts the second seat support frame from the retracted position to the extended position and vice versa and wherein the extended position corresponds to a seat recline position and the retracted position corresponds to an upright seat back position;
a first seat back rotatably connected to the wagon base and leaning against and not connected to the first seat support frame; and
a second seat back rotatably connected to the wagon base and leaning against and not connected to the second seat support frame.

* * * * *